United States Patent
Min et al.

(10) Patent No.: US 9,178,423 B2
(45) Date of Patent: Nov. 3, 2015

(54) RAMP CIRCUIT AND DIRECT CURRENT (DC)-DC CONVERTER THEREOF

(71) Applicant: MagnaChip Semiconductor, Ltd., Cheongju-si (KR)

(72) Inventors: Jun Sik Min, Cheongju-si (KR); Hyoung Kyu Kim, Cheongju-si (KR); Tae Kyoung Kang, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 91 days.

(21) Appl. No.: 14/225,820

(22) Filed: Mar. 26, 2014

(65) Prior Publication Data

US 2014/0347030 A1   Nov. 27, 2014

(30) Foreign Application Priority Data

May 23, 2013   (KR) .................. 10-2013-0058437

(51) Int. Cl.
*H02M 3/156*   (2006.01)
*G05F 3/30*   (2006.01)
*H02M 3/158*   (2006.01)
*H02M 1/14*   (2006.01)

(52) U.S. Cl.
CPC .............. *H02M 3/158* (2013.01); *H02M 1/143* (2013.01)

(58) Field of Classification Search
CPC . H02M 3/156; H02M 3/1588; H02M 3/1563; G05F 3/362; G05F 3/30; G05F 3/265
USPC ................... 323/282, 288, 315, 316
See application file for complete search history.

(56) References Cited

U.S. PATENT DOCUMENTS

| | | | | |
|---|---|---|---|---|
| 5,973,490 | A * | 10/1999 | Nauta | 323/316 |
| 6,768,655 | B1 * | 7/2004 | Yang et al. | 363/21.01 |
| 2002/0057079 | A1 * | 5/2002 | Horie | 323/282 |
| 2006/0164168 | A1 * | 7/2006 | Liu et al. | 330/296 |

FOREIGN PATENT DOCUMENTS

KR   10-2012-0000426 A   1/2012

* cited by examiner

*Primary Examiner* — Adolf Berhane (57) ABSTRACT

Provided are a ramp circuit and a DC-DC converter. The ramp circuit generates a current flowing in a resistor using voltages affected by an output voltage and an input voltage of a DC-DC converter, and generates a ramp signal through copying of the current and charging and discharging of a capacitor using a current mirror unit. The ramp signal is generated by considering the input voltage and the output voltage, and thus the ramp signal has an optimal slope to provide an adaptive response to state change in the input voltage and the output voltage. The DC-DC converter uses such a ramp circuit to facilitate its operation.

20 Claims, 4 Drawing Sheets

RAMP CIRCUIT AND DIRECT CURRENT (DC)-DC CONVERTER THEREOF

CROSS-REFERENCE TO RELATED APPLICATIONS

This application claims the benefit under 35 U.S.C. §119 (a) of Korean Patent Application No. 10-2013-0058437 filed on May 23, 2013, in the Korean Intellectual Property Office, the entire disclosure of which is incorporated herein by reference for all purposes.

BACKGROUND

1. Field

The following description relates to a direct current (DC)-DC converter. The following description also relates to a ramp circuit that improves output characteristics by appropriately compensating a slope of a ramp signal according to an input voltage and an output voltage of a current-controlled mode DC-DC converter, and a corresponding DC-DC converter.

2. Description of Related Art

DC-DC converters include an inductor and a power switch, and are configured to store input power in the inductor and transmit the power. It is theoretically possible for a DC-DC converters have 100% efficiency, or close to such efficiency. Therefore, as recent integrated circuit technology has developed, two or more DC-DC converters are used as an efficient power management circuit in the field of portable apparatus design. Such DC-DC converters are also used in fields of design for apparatuses that require considerable power, such as displays for computers, home appliances, or lights for vehicles.

DC-DC converters are divided into two types of DC-DC converters, including DC-DC converters that use a voltage-controlled mode and DC-DC converters that use a current-controlled mode, according to the control method that is used in the DC-DC converter.

A voltage-controlled mode DC-DC converter includes a simple design because the voltage-controlled mode DC-DC converter generates a pulse for driving a power switch only using a specific output voltage. However, because the DC-DC converter operates in a switching frequency lower than an LC resonant frequency in order to have stable frequency stability, the voltage-controlled mode DC-DC converter has a small frequency range.

Alternatively, because a current-controlled mode DC-DC converter generates a pulse for driving a power switch using an inductor current, the current-controlled mode DC-DC converter operates more stably than in the voltage-controlled mode, without a limitation of an LC resonant frequency. The current-controlled mode DC-DC converter must sense the inductor current stably without reduction of an efficiency. However, the current-controlled mode DC-DC converter reduces the number of devices outside the chip or a size of the device by comparison to a DC-DC converter in the voltage-controlled mode. Therefore, the current-controlled mode DC-DC converter is used in various fields for purposes where these aspects are beneficial.

The current-controlled mode DC-DC converter uses a ramp signal as a signal for generating a pulse width modulation (PWM) signal. The PWM signal produced from the ramp signal is used to remove sub-harmonic oscillation produced by the DC-DC converter. Thus, in the current-controlled mode DC-DC converter, when an output power is larger than an input power, a PWM signal has a duty ratio of 50% or more, and an inductor current operates in a continuous current mode (CCM). When the current-control mode DC-DC converter operates in a CCM mode, and requires a duty ratio 50% or more, there is sub-harmonic oscillation. For example, there is sub-harmonic oscillation in which the inductor current is oscillated in a 1/N frequency of a base wave is caused due to characteristics of an inductor. When the duty ratio is 50% or less, the sub-harmonic oscillation is not caused, and hence the ramp signal is not used.

The ramp signal used for preventing the sub-harmonic oscillation of the current-controlled mode DC-DC converter has a sawtooth shape having a certain slope. The ramp signal is closely related to a sensing signal used for sensing a current flowing in an inductor or a power switch. That is, the ramp signal has to be output so as to remove the sub-harmonic oscillation, after slope compensation is performed, to provide a suitable slope to be used as the sensing signal. The slope compensation of the ramp signal is described with reference to FIG. 1.

Figure 1:
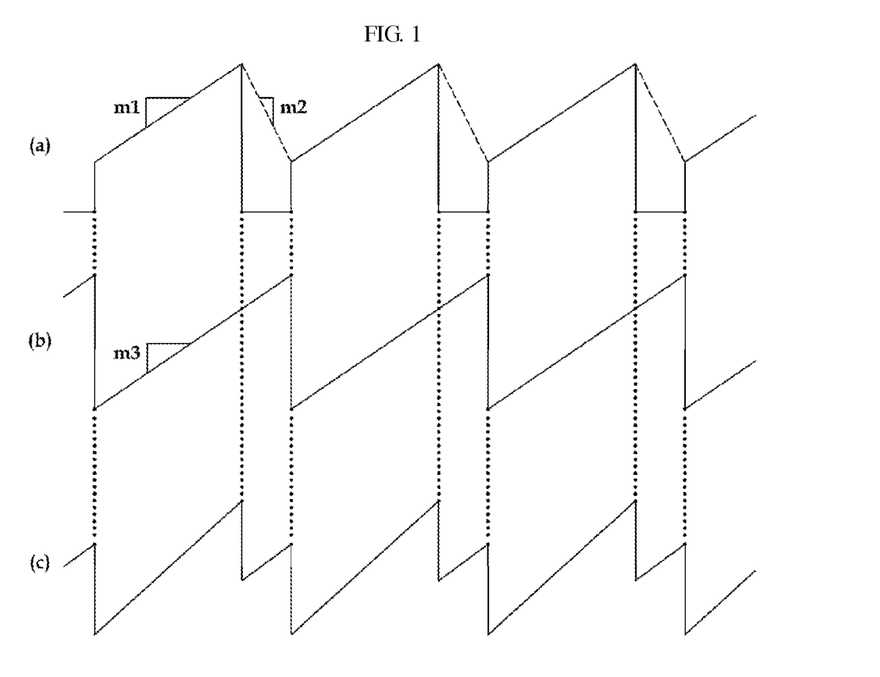
FIG. 1 is a waveform diagram illustrating a relationship between a sensing signal and a ramp signal in a DC-DC converter.

FIG. 1 is a waveform diagram illustrating a relationship between a sensing signal and a slope of a ramp signal in a current-controlled mode DC-DC converter. Hereinafter, a current-controlled mode DC-DC converter is referred to simply as a DC-DC converter, although certain aspects of certain examples may also apply to a voltage-controlled mode DC-DC converter.

In FIG. 1, (a) is a waveform of a sensing signal (SENSE), (b) is a waveform of a ramp signal (RAMP), and (c) is a waveform of a signal (VISEN) in which the sensing signal and the ramp signal are combined. The signals are signals that are applied to a non-inverting (+) terminal of a comparator configured to generate a PWM signal for the DC-DC converter. In FIG. 1, the reference numeral m1 denotes a rising slope of the sensing signal, m2 denotes a falling slope of the sensing signal, and m3 denotes a slope value of the ramp signal.

The suitable slope compensation in the DC-DC converter of FIG. 1 has to satisfy a condition in which the slope m3 of the ramp signal is at least twice as large as the falling slope m2 of the sensing signal.

That is, Equation 1 is as follows, and summarizes a condition for the relationships between the slopes.

$$m3 \geq (m2 - m1) \times 0.5 \qquad \text{Equation 1}$$

Here, $m1 \geq V_{in}/L$, $m2 \geq (V_{out} - V_{in})/L$. $V_{in}$ is the input voltage, and $V_{out}$ is the output voltage.

The slope m3 and falling slope m2 have opposite signs, because slope m3 must have a value that compensates for falling slope m2.

A magnitude of the rising slope m1 of the sensing signal is proportional to an input voltage of the DC-DC converter. Additionally, a magnitude of the falling slope m2 of the sensing signal is proportional to a difference between an output voltage and the input voltage of the DC-DC converter. Therefore, when the input voltage is increased, the falling slope m2 decreases, and when the output voltage is increased, the falling slope m2 increases.

Theoretically, when a value of the slope m3 of the ramp signal is set to 0.5 times of m2, slope compensation is successful for all duty ratios.

However, due to relationships between the rising slope and the falling slope and between the input voltage and the output voltage, the value of the slope m3 of the ramp signal has to be set based on both the output voltage and the input voltage. When the value of the slope m3 of the ramp signal is not suitably compensated, several issues arise. When the slope m3 of the ramp signal is too small, the sub-harmonic oscillation is not removed properly. When the slope m3 of the ramp signal is too large, input/output characteristics of the DC-DC converter are degraded. For example, a dynamic characteristic of the DC-DC converter is degraded or usable power is reduced.

To maintain a stable operation state of the DC-DC converter, the slope m3 of the ramp signal is restricted to have a suitable value. Thus, as described above, compensation is continuously made to maintain the slope as being at least twice larger than (m2−m1), as presented in Equation 1, above. To this end, a ramp circuit for slope compensation is used. Such a ramp circuit compensates slope m3 to cause it to maintain a suitable value.

Figure 2:
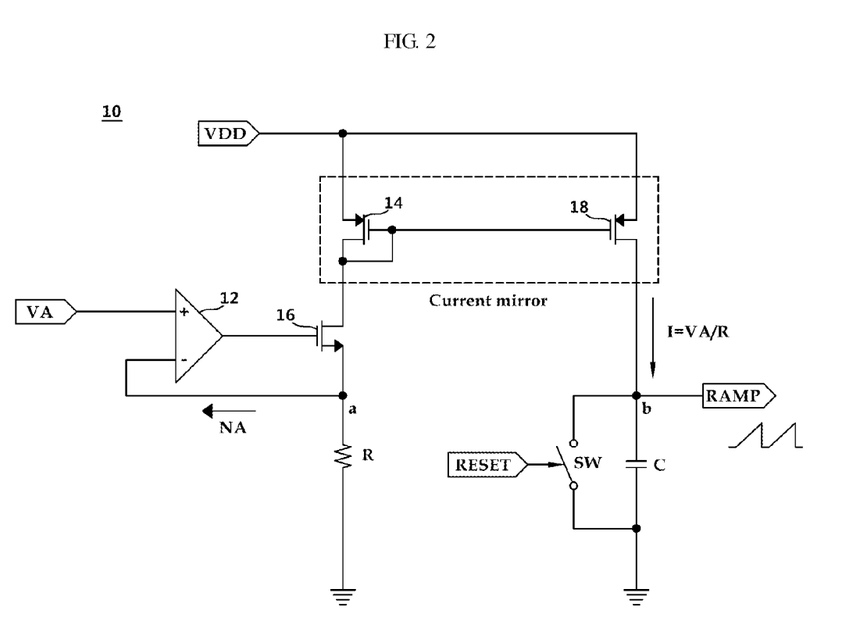
FIG. 2 is a view illustrating a configuration of a ramp circuit in the related art.

FIG. 2 is a view illustrating a configuration of a ramp circuit.

The ramp circuit 10 includes an operation amplifier 12. The operation amplifier 12 receives a first voltage (VA) that is affected by an output voltage, applied to a non-inverting (+) terminal of the operation amplifier 12.

The ramp circuit 10 also includes a first PMOS transistor 14 to which a power voltage (VDD) is applied to its source, and a first NMOS transistor 16 of which a drain is connected to a drain of the first PMOS transistor 14. An output signal of the operational amplifier 12 is input to a gate of the first NMOS transistor 16, and a source signal of the first NMOS transistor 16 is applied to an inverting (−) terminal of the operational amplifier 12.

A resistor (R) of which one side is connected to a ground is also connected to a source of the first NMOS transistor 16.

A second voltage (NA) of the operational amplifier 12 is applied to a node a between the first NMOS transistor 16 and the resistor (R).

The ramp circuit 10 also includes a second PMOS transistor 18 that forms a current mirror structure with the first PMOS transistor 14. The second PMOS transistor 18 receives the power voltage (VDD) at a source. A capacitor (C) of which one side is grounded is connected to a drain of the second PMOS transistor 18. An output terminal, which outputs a ramp signal (RAMP), is connected to a node b between the second PMOS transistor 18 at a drain and the capacitor (C). A switch (SW), configured to turn on and off according to a reset signal (RESET), is connected parallel to the capacitor (C).

The ramp circuit 10 for slope compensation copies a current flowing through the resistor (R), that is, a current value VA/R in which an interlock voltage (VA) is divided by the resistor (R) using a current mirror structure to the second PMOS transistor 18. The ramp circuit 10 charges/discharges a current flowing through the drain of the second PMOS transistor 18 into the capacitor (C). Accordingly, the ramp signal (RAMP) generated according to the charge/discharge operation is output through an output terminal connected to the node b.

However, the ramp circuit in this approach generates the ramp signal by considering only output voltage, as described above.

When a slope of the ramp signal is set by considering a case in which an input voltage is at its lowest, excessive slope compensation is potentially performed when the input voltage is increased. Thus, the excessive slope compensation potentially leads to slope compensation that is more than a preset driving range, to impair dynamic characteristics of the DC-DC converter.

When the input voltage is reduced with respect to the driving range that the ramp circuit is able to compensate for, the slope compensation is not accomplished, and thus the sub-harmonic oscillation is still present. This means that the ramp circuit, which is used for eliminating the sub-harmonic oscillation, is not functioning properly.

As described above, since the slope-compensated ramp signal is generated in the previous examples based only on the output voltage of the DC-DC converter, the scenario in which an oscillation or degradation of input/output characteristics of the DC-DC converter is generated by a change in the input voltage, is not completely eliminated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide a ramp circuit that variably changes a slope of a ramp signal according to changes in an input voltage and an output voltage of a DC-DC converter and provides the ramp signal to the DC-DC converter.

Other examples provide a DC-DC converter that improves output characteristics by employing a ramp circuit configured to adjust a slope of a ramp signal according to change in an input voltage and an output voltage.

In one general aspect, a ramp circuit includes a first amplifier configured to receive a first voltage corresponding to an output voltage, a second amplifier configured to receive a second voltage corresponding to an input voltage, a resistor provided between output terminals of the first amplifier and the second amplifier, a current mirror unit configured to copy a current value that flows in the resistor, and an output unit configured to control a current output from the current mirror unit into a capacitor to output a ramp signal through an output terminal of the output unit.

The current mirror unit may include a first transistor and a second transistor of which a power voltage is received through sources and whose gates are connected to each other, a drain of the first transistor may be connected to the gates of the first transistor and second transistor, and a current value flowing in the resistor may be transferred to the second transistor through current copying from the first transistor.

The ramp circuit may further include a third transistor, and the third transistor may be connected to the output terminal of the first amplifier, a drain of the third transistor may be connected to the drain of the first transistor, and a source of the third transistor may be connected to one side of the resistor.

The first and second transistors may be PMOS transistors, and the third transistor may be an NMOS transistor.

The ramp circuit may further include a switch connected parallel to the capacitor, and the switch may be configured to perform a switching operation based on a reset signal.

The slope of the ramp signal may be varied according to the output voltage and the input voltage.

When the output voltage is increased, the slope of the ramp signal may be increased.

When the input voltage is increased, the slope of the output voltage may be reduced.

The current value may be determined to have the value of the difference between a first voltage and a second voltage, divided by a resistor value.

The first amplifier may be configured to receive the first voltage at a non-inverting (+) terminal, and the second amplifier may be configured to receive the second voltage at a non-inverting (+) terminal.

An output-side voltage of the first amplifier may be fed back to an inverting (−) terminal of the first amplifier and an output-side voltage of the second amplifier may be fed back to an inverting (−) terminal of the second amplifier.

In another general aspect, a direct current (DC)-DC converter includes a ramp circuit configured to vary a slope of a ramp signal according to an input voltage and an output voltage and output the ramp signal, a comparator configured to receive a signal in which the ramp signal and a sensing signal of an inductor are combined through a non-inverting (+) terminal, and configured to receive an output signal of an error amplifier through an inverting (−) terminal, a logic device configured to generate a pulse width modulation (PWM) signal according to an output signal of the comparator and a clock signal; and a power switch configured to turn on and off by the PWM signal.

The ramp circuit may include a first amplifier and a second amplifier configured to output voltage values according to the input voltage and the output voltage, and a resistor connected between output terminals between the first amplifier and the second amplifier.

The ramp circuit may further include a current mirror unit configured to copy a current value that flows in the resistor.

The ramp circuit may further include an output unit configured to control a current output from the current mirror unit into a capacitor to output a ramp signal through an output terminal of the output unit.

In another general aspect, a ramp circuit includes a resistor provided between output terminals of a first amplifier configured to receive a first voltage corresponding to an output voltage and a second amplifier configured to receive a second voltage corresponding to an input voltage, a current mirror unit configured to copy a current value that flows in the resistor, and an output unit configured to control a current output from the current mirror unit into a capacitor to output a ramp signal through an output terminal of the output unit.

The current mirror unit may include a first transistor and a second transistor of which a power voltage is received through sources and whose gates are connected to each other, a drain of the first transistor may be connected to the gates of the first transistor and second transistor, and a current value flowing in the resistor may be transferred to the second transistor through current copying from the first transistor.

The ramp circuit may further include a third transistor, and the third transistor may be connected to the output terminal of the first amplifier, a drain of the third transistor may be connected to the drain of the first transistor, and a source of the third transistor may be connected to one side of the resistor.

The slope of the ramp signal may be varied according to the output voltage and the input voltage.

The current value may be determined to have the value of the difference between a first voltage and a second voltage, divided by a resistor value.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE EMBODIMENTS

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In examples, a ramp signal is appropriately slope-compensated by considering changes in an output voltage and an input voltage of a DC-DC converter. The ramp signal is generated to stably maintain an operation of a DC-DC converter. Examples improve output characteristics of the DC-DC converter, even when a duty ratio changes according to conditions of an input voltage and an output voltage.

Hereinafter, examples of a ramp circuit and a DC-DC converter using such a ramp circuit are described with reference to the accompanying drawings.

Figure 3:
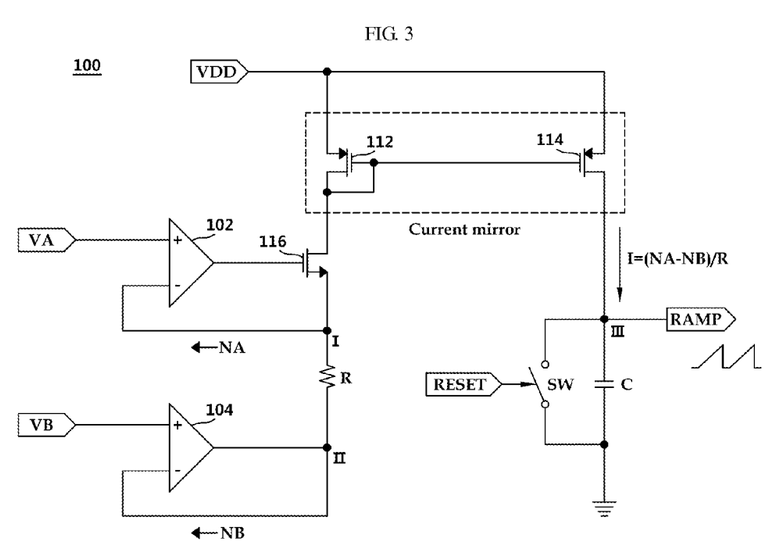
FIG. 3 is a view illustrating a configuration of a ramp circuit according to an example.

First, a configuration of a ramp circuit is described with reference to FIG. 3. FIG. 3 is a view illustrating a configuration of a ramp circuit according to an example.

A ramp circuit 100 includes a first operational amplifier 102. The first operational amplifier 102 has a first voltage (VA) affected by an output voltage input to a non-inverting (+)

terminal. An output-side voltage (NA) of the first operational amplifier 102 is fed back to an inverting (−) terminal of the first operational amplifier 102. The output-side voltage (NA) has substantially the same voltage level as that of the first voltage (VA).

In this example, additional elements are added since an input voltage of the DC-DC converter is to be taken into consideration, in addition to the output voltage.

Therefore, the ramp circuit 100 also includes a second operational amplifier 104 that has a second voltage (VB) affected by an input voltage is input to a non-inverting (+) terminal. An output-side voltage (NB) of the second operational amplifier 104 is fed back to an inverting (−) terminal of the second operational amplifier 104. The output-side voltage (NB) has substantially the same voltage level as that of the second voltage (VB).

Thus, the output-side voltages (NA and NB) are maintained at the levels of the first voltage (VA) and the second voltage (VB). As described above, the first voltage (VA) and the second voltage (VB) are voltages affected by the output voltage and the input voltage of the DC-DC converter. Therefore, the output-side voltages (NA and NB) are also voltages affected by the output voltage and the input voltage of the DC-DC converter. Hereinafter, the output-side voltages (NA and NB) are referred to as a third voltage and a fourth voltage, respectively.

The ramp circuit 100 includes a first PMOS transistor 112 of which a voltage power (VDD) is applied to its source. The first PMOS transistor 112 forms a current mirror structure with a second PMOS transistor 114.

The ramp circuit 100 also includes a first NMOS transistor 116 that has a drain that is connected to a drain of the first PMOS transistor 112. The first NMOS transistor 116 also has an output signal of the first operational amplifier 102 is input through a gate, and a source that is connected to the inverting (−) terminal of the first operational amplifier 102 through a first node (I).

A resistor (R) is connected between the first node (I) extending from a source of the first NMOS transistor 116, and a second node (II) extending from an output terminal of the second operational amplifier 104. The resistor (R) generates a current value when the third voltage and the fourth voltage are applied to both sides of the resistor (R). The current value flowing in the resistor R has a value of (NA−NB)/R.

The ramp circuit 100 also includes a second PMOS transistor 114. The second PMOS transistor 114 forms a current mirror structure with the first PMOS transistor 112 and a power voltage (VDD) is applied to a source of the second PMOS transistor 114. The current value output through a drain of the second PMOS transistor 114 according to the current mirror operation has a value of (NA−NB)/R.

The ramp circuit 100 also includes a capacitor (C) of which one side is connected to the drain of the second PMOS transistor 114 and the other side is connected to a ground. A switch (SW) is provided, connected parallel to the capacitor (C). The switch (SW) performs a switching operation by selectively transmitting a reset signal (RESET).

The output terminal configured to output a ramp signal (RAMP) is connected to a third node (III) provided between the second PMOS transistor 114 and the capacitor (C). In an example, the ramp signal output through the third node (III) is used to generate a PWM signal in the DC-DC converter, as is described further later.

The ramp circuit having the configuration of the example outputs the ramp signal to have an appropriate slope that is chosen to provide slope-compensation according to the input voltage and the output voltage.

That is, since the input voltage and the output voltage are taken into consideration in this example, the current value, which is (VA−VB)/R, in which the fourth voltage is subtracted from the third voltage and is divided by the resistor (R) flows in the resistor (R) located between the first node (I) and the second node (II). Therefore, in this example, the current value changes according to changes in the output voltage and the input voltage.

The current value (VA−VB)/R is copied to the second PMOS transistor 114 through the current mirror structure, and the second PMOS transistor 114 outputs the same current value as the current value (VA−VB)/R. That is, even when the current value flowing in the resistor (R) changes continuously, the current value sent through the current mirror is copied and transferred to the second PMOS transistor 114 accordingly.

The current value output through a drain of the second PMOS transistor 114 is charged and discharged to the capacitor (C), and a ramp signal generated according to the charge/discharge operation is output through the output terminal connected to the third node (III).

The ramp signal output (RAMP) through the output terminal in this example includes the characteristic of taking both input and output voltages into consideration.

That is, the ramp circuit according to the example takes the input and output voltages into consideration as described above by using both of them to generate the ramp signal output (RAMP).

When the output voltage is increased, the first voltage (VA) affected by the output voltage is input to the non-inverting (+) terminal of the first operational amplifier 102, and the third voltage applied to the node I as the output is increased. Hence, the slope of the ramp signal increases due to these increases in voltage. When the input voltage is increased, the second voltage (VB) affected by the input voltage is input to the non-inverting (+) terminal of the second operational amplifier 104, and the fourth voltage applied to the node II as the output is increased. Hence, the slope of the ramp signal decreases due to these decreases in voltage.

When the output voltage (VA) and the input voltage (VB) of the DC-DC converter change, the slope, that is, an m3 value of the ramp signal, as shown in FIG. 1 is changed as well. Therefore, in the example, a DC-DC converter that has a large difference between output power and input power, the slope compensation of the ramp signal is still appropriately performed according to changes in the input voltage and the output voltage.

Figure 4:
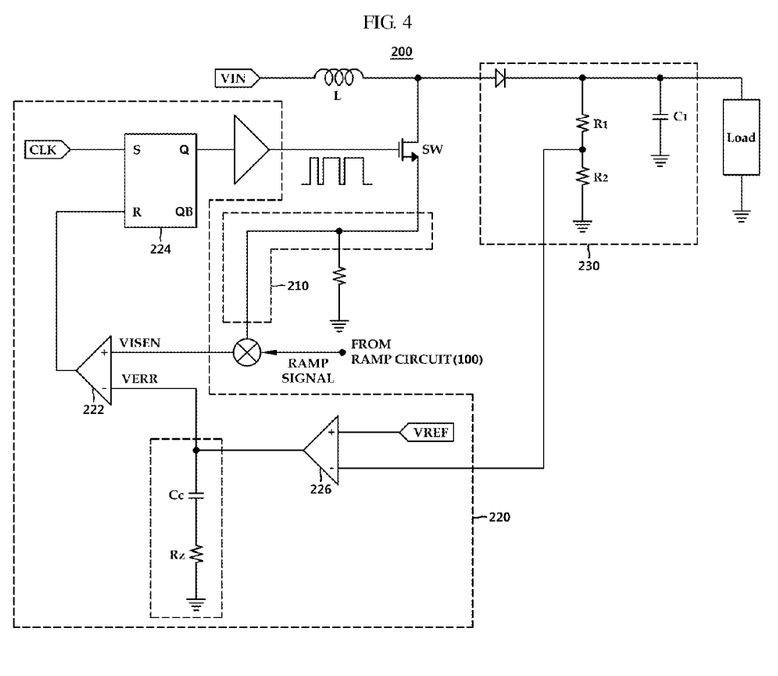
FIG. 4 is a view illustrating an entire configuration of a DC-DC converter to which the ramp circuit of FIG. 3 is applied, according to an example.

FIG. 4 is a view illustrating a configuration of a DC-DC converter to which the ramp circuit is applied, according to an example.

A DC-DC converter 200 according to the example includes a sensor 210 configured to sense a current value flowing in the inductor (or a power switch) since the DC-DC converter 200 operates in a current-controlled mode. The sensor 210 is directly connected to the power switch (SW). In an example, as the power switch (SW), a NMOS transistor is used.

A PWM signal generator 220 configured to generate a PWM signal for turning on/off the power switch (SW) is included. The PWM signal generator 220 includes a comparator 222 and a SR-latch 224 configured to receive an output of the comparator 222 and a clock signal (CLK). Therefore, the PWM signal is generated by driving the SR latch 224 by the clock signal (CLK) and the output of the comparator 222.

The comparator 222 receives as inputs two different signals. An output signal (VERR) of an error amplifier 226 is input to an inverting (−) terminal of the comparator 222. A signal (VISEN) in which a sensing signal and a ramp signal are combined is input to a non-inverting (+) terminal of the comparator 222. The sensing signal is a current value sensed by the sensor 210, and the ramp signal is a signal transferred from the ramp circuit (see 100 of FIG. 3) suggested for slope compensation.

A reference voltage (VREF) is applied to a non-inverting (+) terminal of the error amplifier 226, and a feedback voltage is applied to an inverting (−) terminal. The feedback voltage is transferred from the output unit 230 of the DC-DC converter 200. Further, a capacitor (Cc) and a resistor (Rz) connected parallel to an output side of the error amplifier 226 are configured to perform frequency compensation.

When the DC-DC converter 200 generates the PWM signal, the ramp signal generated in the ramp circuit 100 of FIG. 3 is transferred, and the slope of the ramp signal can be appropriately compensated based on the interaction of the elements in the DC-DC converter 200 with the ramp circuit 100 of FIG. 3.

According to the above-described example, the ramp signal has a slope of an optical condition. The slope is based on considering the state change between the input voltage and the output voltage of the DC-DC converter. Therefore, an operation of the DC-DC converter is stable and output characteristics are improved.

The ramp circuit having the above-described configuration and the DC-DC converter including the ramp circuit according to the example has the following effects.

The example takes changes in both the input voltage and output voltage of the DC-DC converter into consideration. That is, the ramp circuit adaptively responds to the changes in both the output voltage and input voltage to generate a ramp signal having an optimal slope.

Therefore, sub-harmonic oscillation caused when the ramp signal slope-compensates by considering only the output voltage can be completely removed. An effect of improved input/output characteristics of the DC-DC converter according to use of the stable ramp signal results.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A ramp circuit, comprising:
   a first amplifier configured to receive a first voltage corresponding to an output voltage;
   a second amplifier configured to receive a second voltage corresponding to an input voltage;
   a resistor provided between output terminals of the first amplifier and the second amplifier;
   a current mirror unit configured to copy a current value that flows in the resistor; and
   an output unit configured to control a current output from the current mirror unit into a capacitor to output a ramp signal through an output terminal of the output unit.

2. The ramp circuit of claim 1, wherein the current mirror unit comprises a first transistor and a second transistor of which a power voltage is received through sources and whose gates are connected to each other,
   a drain of the first transistor is connected to the gates of the first transistor and second transistor, and
   a current value flowing in the resistor is transferred to the second transistor through current copying from the first transistor.

3. The ramp circuit of claim 2, further comprising a third transistor,
   wherein the third transistor is connected to the output terminal of the first amplifier,
   a drain of the third transistor is connected to the drain of the first transistor, and
   a source of the third transistor is connected to one side of the resistor.

4. The ramp circuit of claim 3, wherein the first and second transistors are PMOS transistors, and the third transistor is an NMOS transistor.

5. The ramp circuit of claim 1, further comprising a switch connected parallel to the capacitor, and wherein
   the switch is configured to perform a switching operation based on a reset signal.

6. The ramp circuit of claim 1, wherein the slope of the ramp signal is varied according to the output voltage and the input voltage.

7. The ramp circuit of claim 6, wherein when the output voltage is increased, the slope of the ramp signal is increased.

8. The ramp circuit of claim 6, wherein when the input voltage is increased, the slope of the output voltage is reduced.

9. The ramp circuit of claim 1, wherein the current value is determined to have the value of the difference between a first voltage and a second voltage, divided by a resistor value.

10. The ramp circuit of claim 1, wherein the first amplifier is configured to receive the first voltage at a non-inverting (+) terminal, and the second amplifier is configured to receive the second voltage at a non-inverting (+) terminal.

11. The ramp circuit of claim 10, wherein an output-side voltage of the first amplifier is fed back to an inverting (−) terminal of the first amplifier and an output-side voltage of the second amplifier is fed back to an inverting (−) terminal of the second amplifier.

12. A direct current (DC)-DC converter comprising:
   a ramp circuit configured to vary a slope of a ramp signal according to an input voltage and an output voltage and output the ramp signal;
   a comparator configured to receive a signal in which the ramp signal and a sensing signal of an inductor are combined through a non-inverting (+) terminal, and configured to receive an output signal of an error amplifier through an inverting (−) terminal;
   a logic device configured to generate a pulse width modulation (PWM) signal according to an output signal of the comparator and a clock signal; and
   a power switch configured to turn on and off by the PWM signal.

13. The DC-DC converter of claim 12, wherein the ramp circuit comprises:
   a first amplifier and a second amplifier configured to output voltage values according to the input voltage and the output voltage; and
   a resistor connected between output terminals between the first amplifier and the second amplifier.

14. The DC-DC converter of claim 13, wherein the ramp circuit further comprises:
   a current mirror unit configured to copy a current value that flows in the resistor.

15. The DC-DC converter of claim 14, wherein the ramp circuit further comprises:
   an output unit configured to control a current output from the current mirror unit into a capacitor to output a ramp signal through an output terminal of the output unit.

16. A ramp circuit, comprising:
   a resistor provided between output terminals of a first amplifier configured to receive a first voltage corresponding to an output voltage and a second amplifier configured to receive a second voltage corresponding to an input voltage;
   a current mirror unit configured to copy a current value that flows in the resistor; and
   an output unit configured to control a current output from the current mirror unit into a capacitor to output a ramp signal through an output terminal of the output unit.

17. The ramp circuit of claim 16, wherein the current mirror unit comprises a first transistor and a second transistor of which a power voltage is received through sources and whose gates are connected to each other,
   a drain of the first transistor is connected to the gates of the first transistor and second transistor, and
   a current value flowing in the resistor is transferred to the second transistor through current copying from the first transistor.

18. The ramp circuit of claim 17, further comprising a third transistor,
   wherein the third transistor is connected to the output terminal of the first amplifier,
   a drain of the third transistor is connected to the drain of the first transistor, and
   a source of the third transistor is connected to one side of the resistor.

19. The ramp circuit of claim 16, wherein the slope of the ramp signal is varied according to the output voltage and the input voltage.

20. The ramp circuit of claim 16, wherein the current value is determined to have the value of the difference between a first voltage and a second voltage, divided by a resistor value.

* * * * *